Jan. 27, 1953  G. E. WILSON ET AL  2,626,837
WHEEL LUG LOCKING RING

Filed Oct. 2, 1950  2 SHEETS—SHEET 1

George E. Wilson
John K. Vaughn
INVENTORS

BY *Clarence A. O'Brien*
*and Harvey B. Jacobson*
Attorneys

Jan. 27, 1953
G. E. WILSON ET AL
2,626,837
WHEEL LUG LOCKING RING
Filed Oct. 2, 1950
2 SHEETS—SHEET 2
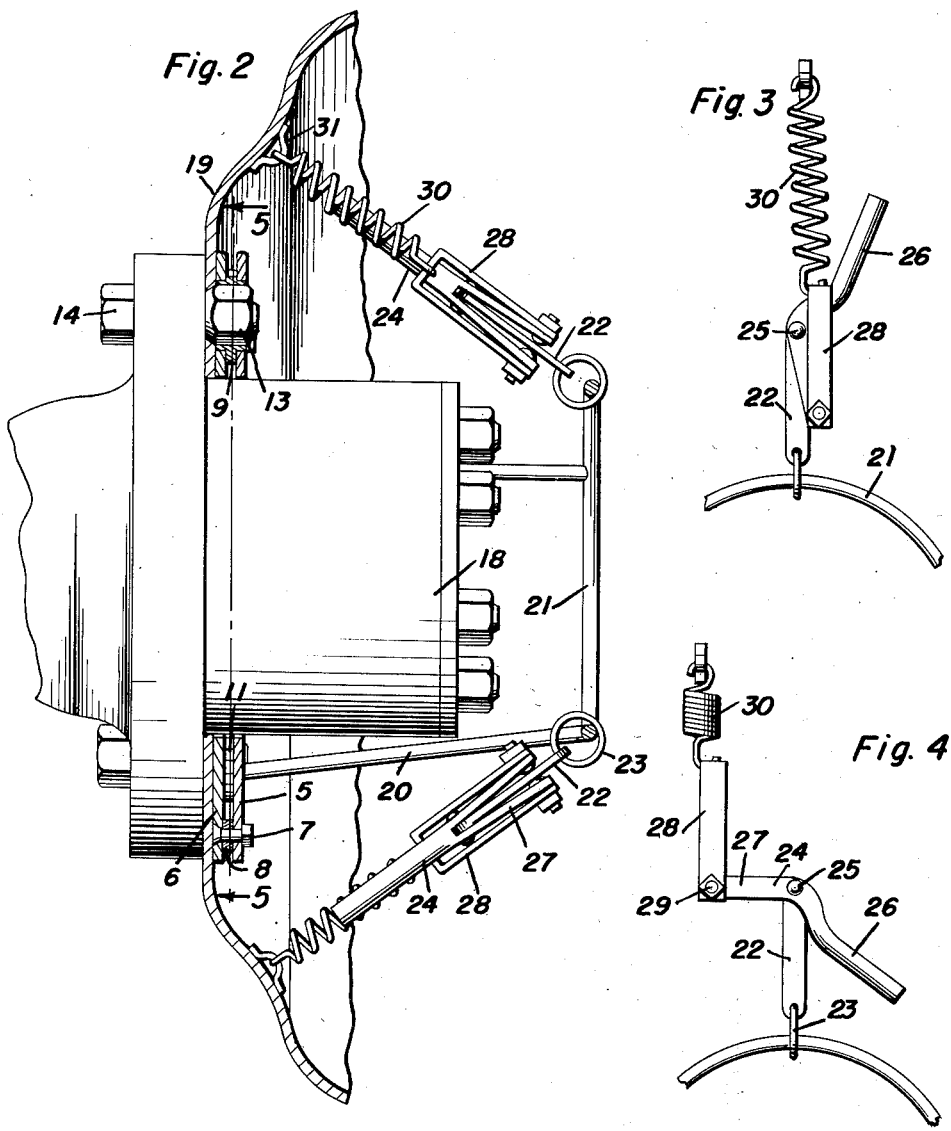
George E. Wilson
John K. Vaughn
INVENTORS Patented Jan. 27, 1953

2,626,837

UNITED STATES PATENT OFFICE 2,626,837

WHEEL LUG LOCKING RING

George E. Wilson and John K. Vaughan, El Paso, Tex.

Application October 2, 1950, Serial No. 187,918

2 Claims. (Cl. 301—9)

1

The present invention relates to new and useful improvements in locking rings for the wheel lugs of motor vehicles to prevent accidental loosening of the wheel lugs or nuts.

An important object of the invention is to provide a wheel lug locking ring which engages all of the wheel lugs to provide a unitary locking structure therefor.

A further object of the invention is to provide ratcheting lug engaging means carried by the ring whereby the lug may be tightened without removing the ring from the wheel, but which holds the lug from opposite turning movement in a direction to loosen the lug.

Another object of the invention is to provide novel means for attaching the locking ring to the vehicle wheel and which may be easily and quickly released without the use of tools of any character.

A still further object is to provide an apparatus of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a transverse sectional view showing the locking ring applied to a wheel;

Figure 3 is a side elevational view of one of the attaching levers for holding the locking ring on the wheel and showing the lever in locking position;

Figure 4 is a similar view showing the lever in its released position;

Figure 1:
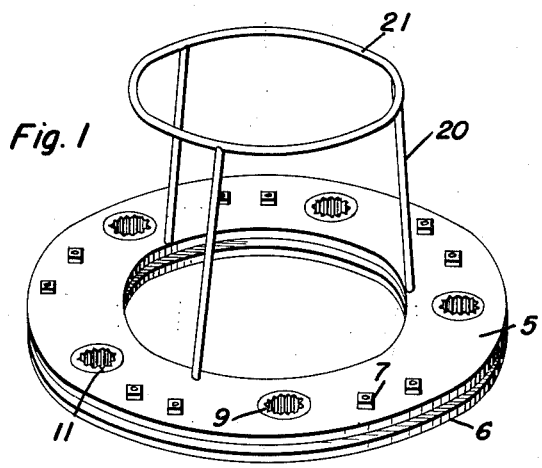
Figure 1 is a perspective view of the locking ring.
Figure 5:
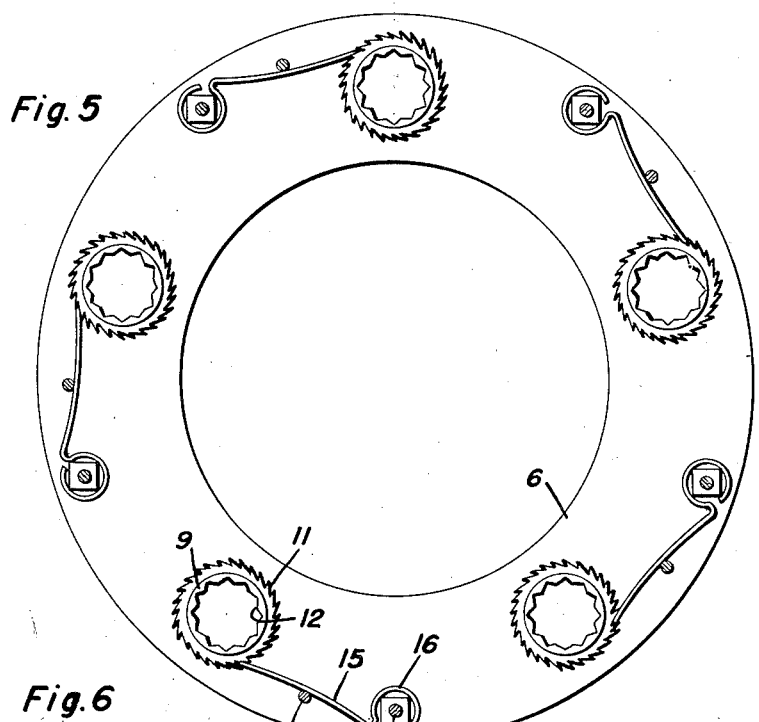
Figure 5 is a sectional view of the locking ring taken substantially on the line 5—5 of Figure 2.
Figure 6:
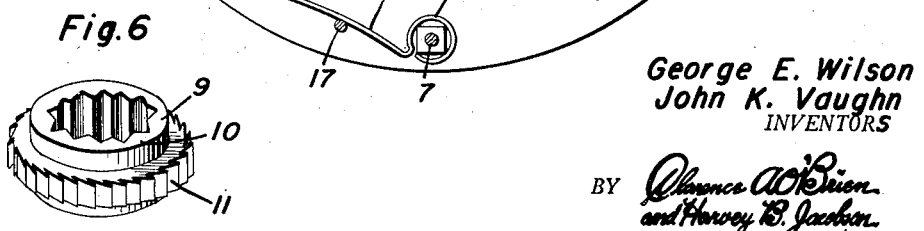
Figure 6 is an enlarged perspective view of one of the ratcheting locking nuts.

Referring now to the drawings in detail, wherein, for the purpose of illustration, I have disclosed a preferred embodiment of the invention, the numerals 5 and 6 designate a pair of rings secured to each other in side-by-side or confronting relation by bolts and nuts 7 with spacing washers or collars 8 on the bolts between the rings to hold the rings 5 and 6 spaced from each other.

2

A plurality of ratcheting nuts 9 are formed with annular end portions 10 rotatable in openings 11 in the rings 5 and 6 and the central portions of nuts 9 are formed with ratchet teeth 11 positioned between the rings 5 and 6 and which hold the nuts 9 from endwise movement in the openings 11 of the rings. The nuts 9 are polygonally constructed internally or notched, as shown at 12, to receive the nut 13 of a wheel lug 14.

The ratchet teeth 11 of each nut 9 are engaged by the free end portion of a flat spring 15 which is formed at its other end with an eye 16 engaged on the bolts and nuts 7 and the central portion of the spring 15 bears against a stop pin 17 to hold the spring engaged with the ratchet teeth.

The assembled locking rings 5 and 6 are fitted over the hub 18 of a vehicle wheel 19 to engage the nut 13 of the wheel lugs in the nuts 9 of the locking rings and a plurality of rods 20 are welded or otherwise suitably fixed at one end to the outermost ring 5 and are positioned at the sides of hub 18 to support a ring 21 at the outer ends of rods 20 and to which the ring 21 is welded or otherwise suitably secured.

The ring 21 forms an attaching ring and to which links 22 are attached by means of rings 23 at one end of the links. Levers 24 are pivoted to the other ends of links 22 by pins 25, the levers including a handle portion 26 and a bifurcated or forked end portion 27 and with respect to which the handle portion 26 is positioned angularly to form a bellcrank lever connected at its central portion to the link 22.

A yoke 28 is pivoted at its ends to the bifurcated or forked end portion 27 of lever 24 by means of bolts and nuts or the like 29 and the bight or central portion of yoke 28 is attached to one end of a coil spring 30 which has its other end attached to wheel 19 by means of a clip 31.

In the operation of the device, nut 9 of locking rings 5 and 6 are placed over the nuts 13 of the wheel lugs 14 in the manner as illustrated in Figure 2 of the drawings, and in order to place the locking rings 5 and 6 in this position, the handle portions 26 of levers 24 are swung inwardly toward attaching ring 21 in the position shown in Figure 4 to release the tension of springs 30.

After the locking rings 5 and 6 have been placed in position on the nuts 13, the handle portions 26 of levers 24 are swung in a direction toward springs 30 to place the springs 30 under tension and to pull the locking rings 5 and 6 inwardly toward wheel 19. In so doing, the yoke 28 is moved past center of the pivot 25 for the lever 24, as shown in Figure 3 of the drawings, to thus lock the lever and to hold the locking rings 5 and 6 engaged with the nuts 13.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A wheel lug lock comprising inner and outer rings, means carried by the inner ring lockably engaging the lugs of a wheel, and means connecting the outer ring to the wheel to hold the inner ring engaged with the lugs, said last-named means including an expansible spring, a locking handle, toggle means connecting the handle to the ring, and toggle means connecting the handle to the spring for holding the spring under tension to pull the inner ring inwardly against the wheel.

2. A wheel lug lock comprising a pair of rings secured to each other in spaced apart side-by-side relation, nuts rotatably supported by the rings and adapted for engaging the fastening lugs of the wheel for turning with the lugs in a direction to tighten the lugs, ratchet teeth on the periphery of the nuts and positioned between the rings to hold the nuts assembled therewith, pawls carried by the rings and engaging the teeth to hold the nuts from turning in an opposite direction, a frame including a plurality of rods fixed at one end to one of said rings and projecting outwardly at one side of said pair of rings, a ring fixed to the outer ends of the rods, and spring means connecting the last-named ring to the wheel to hold the pair of rings against one side of the wheel.

GEORGE E. WILSON.
JOHN K. VAUGHAN.

REFERENCES CITED

The following references are of record in the file of this patent:

UNITED STATES PATENTS

| Number | Name | Date |
|---|---|---|
| 587,557 | Reardon | Aug. 3, 1897 |
| 1,188,420 | Eadie | June 27, 1916 |
| 1,484,689 | Walker | Feb. 26, 1924 |
| 1,843,985 | Nelson | Feb. 9, 1932 |
| 2,280,584 | Horn | Apr. 21, 1942 |
| 2,404,520 | Mosher | July 23, 1946 |